United States Patent [19]

Hamilton

[11] Patent Number: 4,696,705

[45] Date of Patent: Sep. 29, 1987

[54] GAS GENERATING MATERIAL

[75] Inventor: Brian K. Hamilton, Littleton, Colo.

[73] Assignee: TRW Automotive Products, Inc., Lyndhurst, Ohio

[21] Appl. No.: 946,376

[22] Filed: Dec. 24, 1986

[51] Int. Cl.$^4$ ............................................. C06B 45/02
[52] U.S. Cl. .......................................... 149/21; 149/2; 149/35; 149/40; 149/41; 149/110; 149/114; 102/289; 102/292; 102/530
[58] Field of Search .................... 149/2, 40, 21, 41, 35, 149/110, 114; 102/530, 289, 292

[56] References Cited

U.S. PATENT DOCUMENTS

| | | | |
|---|---|---|---|
| 3,476,623 | 11/1969 | Menke et al. | 149/35 |
| 3,895,098 | 7/1975 | Pietz | 423/351 |
| 3,920,575 | 11/1975 | Shiki et al. | 149/35 |
| 3,931,040 | 1/1976 | Breazeale | 149/35 |
| 3,950,009 | 4/1976 | Hamilton | 250/150 AB |
| 4,062,708 | 12/1977 | Goetz | 149/35 |
| 4,072,546 | 2/1978 | Winer | 149/19.8 |
| 4,094,028 | 6/1978 | Fujiyama et al. | 149/35 |
| 4,203,787 | 5/1980 | Kirchoff et al. | 149/35 |
| 4,386,979 | 6/1983 | Jackson | 149/21 |
| 4,533,416 | 8/1985 | Poole | 149/35 |

Primary Examiner—Stephen J. Lechert, Jr.
Attorney, Agent, or Firm—Tarolli, Sundheim & Covell

[57] ABSTRACT

Structure for generating nitrogen gas for inflating an air bag vehicle occupant restraint comprises a grain made of an azide based material which generates gas upon combustion. The grain is made of a gas generating material which includes 61-68% by weight of sodium azide, 0-5% by weight of sodium nitrate, 0-5% by weight of bentonite, 23-28% by weight of iron oxide, 1-2% by weight of fumed silica, and from about 2 to about 6% by weight of graphite fibers having a diameter of 3-15 microns and an average length of 40 to 125 thousandths of an inch.

7 Claims, 4 Drawing Figures

GAS GENERATING MATERIAL

BACKGROUND OF THE INVENTION

The present invention relates to gas generating material, and particularly to a gas generating grain which is made of an azide based material that generates gas upon combustion.

Various azide based materials are known for generating gas on combustion. These materials are used to inflate a vehicle occupant restraint such as an air bag. In the event of sudden deceleration of the vehicle, such as would be caused by a colision, the gas generating material is ignited and gas is generated. The gas is directed into the air bag to inflate the air bag. The air bag then cushions the movement of the occupant relative to the vehicle and prevents the occupant from having a violent collision with parts of the vehicle.

In air bag systems, the gas generating material desirably must be capable of producing nontoxic, nonflammable, and essentially smokeless gas over a wide variety of temperatures and other environmental conditions. The gases that are generated must be at a sufficiently low temperature so as not to destroy the restraint or injure the occupant. The gas generating material also must be capable of generating a substantial amount of gas within a very short period of time.

Known materials which generate gas to inflate an inflatable occupant restraint include an alkali metal azide. U.S. Pat. Nos. 4,062,708; 3,931,040 and 3,895,098 are examples of patents which disclose such materials for generating gas to inflate an air bag. U.S. Pat. No. 4,062,708 discloses a material which includes sodium azide and iron oxide. The material is formed into pellets. When the pellets burn, nitrogen gas is produced and some combustion products are left as a substantially solid sinter with sufficient interconnected cells and passages to hold combustion products which would undesirably enter the air bag.

SUMMARY OF THE INVENTION

The present invention is directed to a gas generating grain made of azide based material which includes fibers such as graphite fibers. Preferably 2-6% by weight graphite fibers are included in the grain material. The graphite fibers are 3-15 microns in diameter and 40 to 125 thousandths of an inch in average length. The fibers perform three functions. First, the fibers reinforce the grain and thus minimize the possibility of cracks developing in the grain. Such cracks would produce unwanted additional grain surface area that acts to accelerate the grain burn rate in an unpredictable manner. Second, the fibers reinforce the sinter produced when the grain burns so that as the grain burns it more readily forms a structural sinter. Third, the fibers are highly thermally conductive and thus increase the grain burn rate while decreasing the combustion temperature of the grain because of the specific heat of the fibers.

In addition, the grain is coated with an ignition enhancing coating. The coating, when ignited, causes flame to spread nearly simultaneously to all exposed surfaces of the gas generating grain. The coating includes 20 to 50% by weight of sodium azide, 25 to 35% by weight of sodium nitrate, 10 to 15% by weight of a fluoroelastomer, 15 to 25% by weight of magnesium, and 1-3% by weight of fumed silicon dioxide. The coating is claimed in copending application of Goetz and Hamilton, Ser. No. 915,266 assigned to the assignee of the present invention.

DESCRIPTION OF THE DRAWINGS

Further features and advantages of the present invention will be apparent to those skilled in the art to which the present invention relates from reading the following detailed description of the invention with reference to the accompanying drawings wherein.

DESCRIPTION OF A PREFERRED EMBODIMENT

The present invention relates to structure for generating gas, and specifically to a grain made of an azide based material which generates gas upon combustion. The grain is primarily for use in generating nitrogen gas to inflate an inflatable vehicle occupant restraint or air bag.

Figure 1:
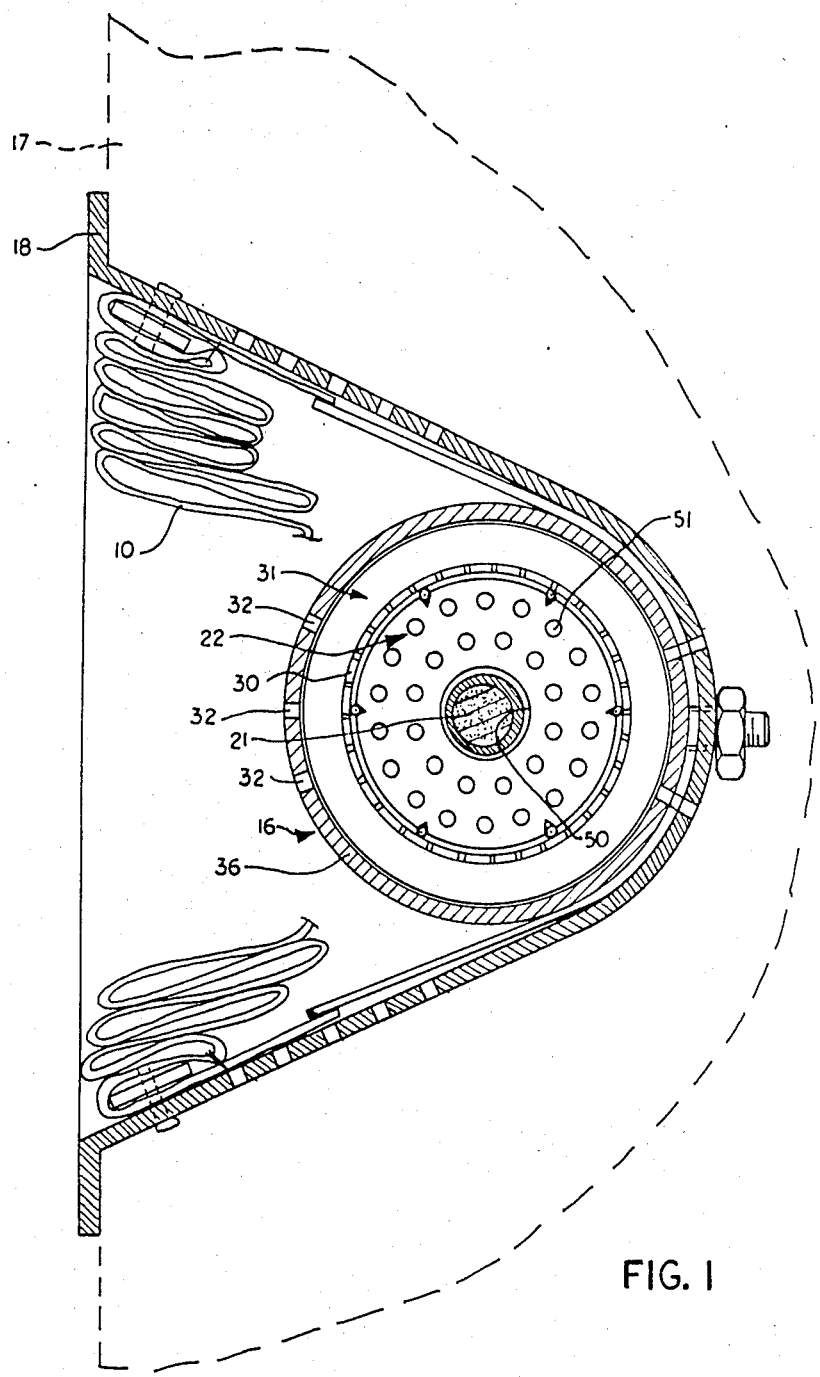
FIG. 1 is a sectional view of an air bag system embodying the present invention.

FIG. 1 illustrates a vehicle occupant restraint system which includes an air bag 10. When the vehicle becomes involved in a collision, the airbag 10 is expanded from a collapsed condition, shown in FIG. 1, to an extended condition by a rapid flow of gas frm an inflator 16. When the airbag 10 is in the extended condition, it restrains movement of an occupant of the vehicle and prevents the occupant from violently contacting structural parts of the vehicle interior.

Although the airbag 10 could be mounted on many different parts of the vehicle, it is illustrated in FIG. 1 as being mounted on a dashboard 17 of the vehicle. The air bag 10 is fixed to a rigid metal reaction canister 18 which is fixed to the dashboard 17. The inflator assembly 16 is oriented within the reaction canister 18 so that flow of gas causes the airbag to expand rearwardly relative to the vehicle into the passenger compartment. The specifics of the inflator 16 will not be described in detail since such do not form a part of the present invention and are disclosed in copending application Ser. No. 915,266, assigned to the assignee of the present invention.

When the airbag 10 is expanded, it engages the torso of an occupant of a vehicle to restrain forward movement of the occupant of the vehicle toward the dashboard 17 under the influence of collision-induced forces. The airbag 10 quickly collapses so that the occupant is free to exit from the vehicle. To effect collapsing of the airbag 10, the airbag 10 is preferably formed of a porous material which enables gas to flow out of the bag into the vehicle passenger compartment.

Figure 2:
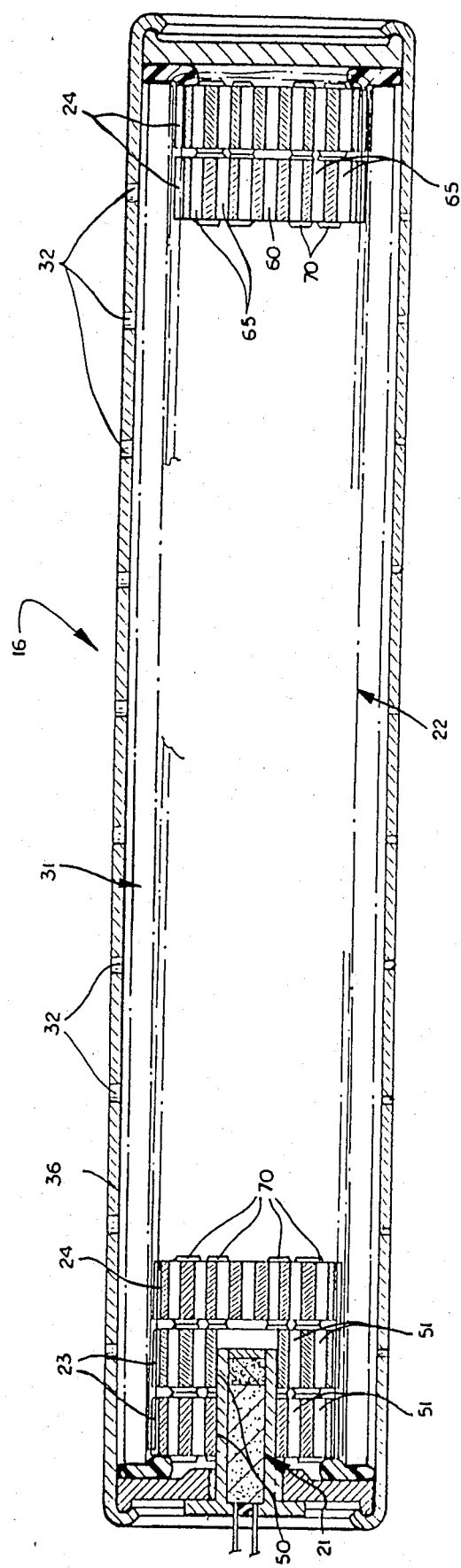
FIG. 2 is a cross sectional view of a portion of the air bag system of FIG. 1.
Figure 3:
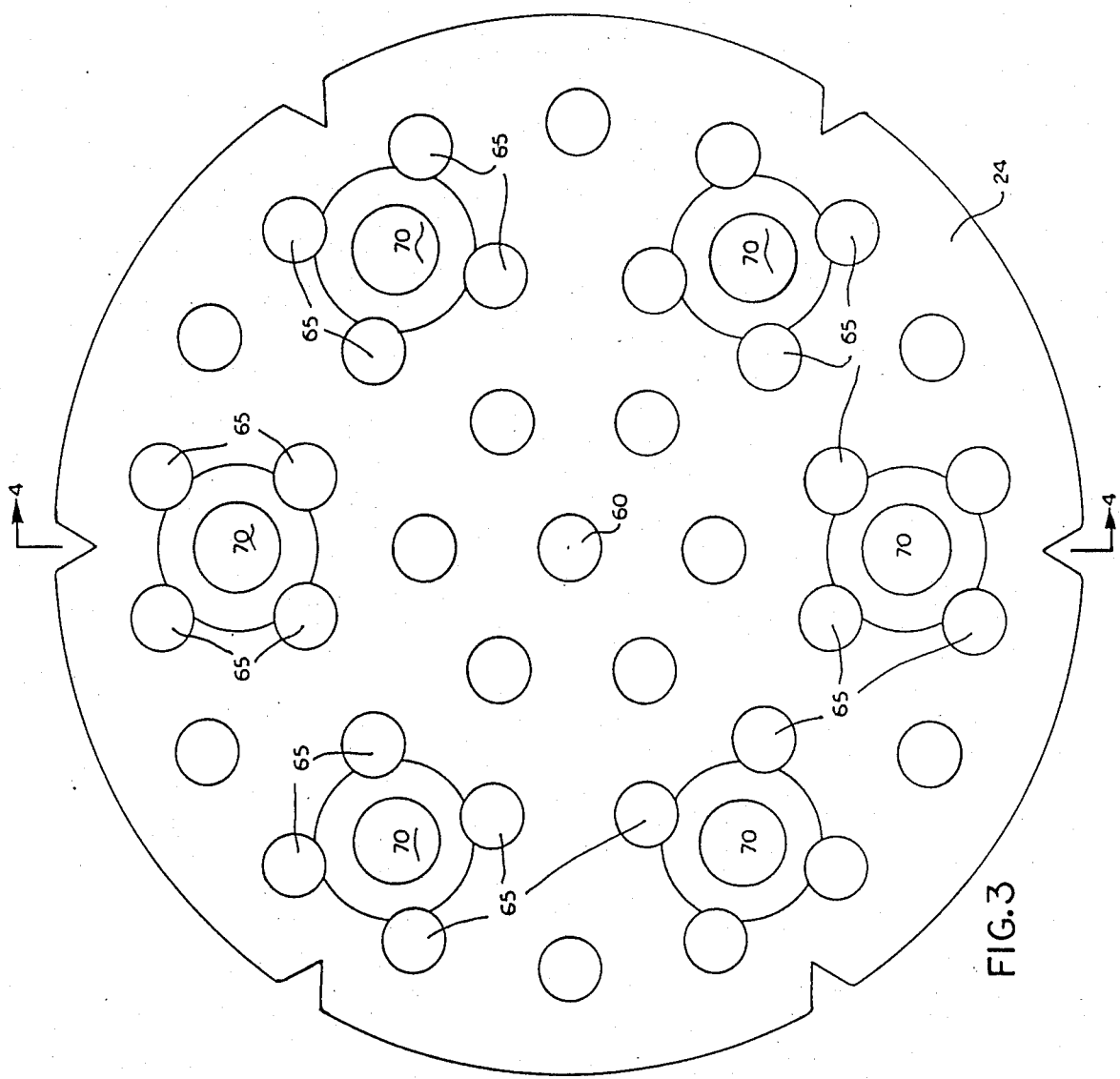
FIG. 3 is a plan view of a gas generating grain used in the air bag system of FIG. 1.

Upon the occurrence of a collision, an inertia sensor (not shown) transmits a signal to effect actuation of an ignitor assembly or squib 21 at one end of the inflator assembly 16. Hot gases and flame from the ignitor assembly 21 cause ignition of gas generating material 22 supported in the inflator assembly 16. The gas generating material 22 includes a plurality (e.g. two) of cylindrically shaped grains 23 which encircle the ignitor assembly 21, as shown in FIG. 2, and a plurality of coaxial cylindrically shaped grains 24, one of which is shown in FIG. 3, which are spaced from the ignitor assembly 21. The actuation of the ignitor assembly 21 and the ignition of the grains 23, 24 is extremely rapid and combustion of the grains 23, 24 occurs quickly to generate a relatively large volume of gas rapidly. Specifically, the air bag is inflated in 20–40 milli-seconds.

The gas generated by combustion of the grains 23, 24 flows through openings in a rigid cylindrical tube 30 (FIG. 1) which surrounds the grains 23, 24. The gas then flows through a filter 31 (shown schematically in FIGS. 1 and 2). The filter 31 is made of a plurality of layers of wire mesh, steel wool and fiberglass. The filter 31 prevents sparks and/or particles of hot material from entering the airbag 10. Lastly, the gas flows through rearwardly facing openings 32 in a cylindrical sidewall of the inflator housing 36 into the reaction canister and the airbag 10.

Each of the cylindrical grains 23 has a circular central passage 50 which receives the cylindrical ignitor 21. The passage 50 extends through the grains 23 between axially opposite end faces of the grains. The central axis of the passage 50 is coincident with the central axis of the cylindrical grains 23. In order to maximize the rate of combustion of the grains 23 and the amount of gas generated, a plurality of cylindrical passages 51 extend through the grains 23 between the axially opposite end faces. The axes of the passages 51 extend parallel to the central axes of the grains 23 and the central passages 50.

Figure 4:
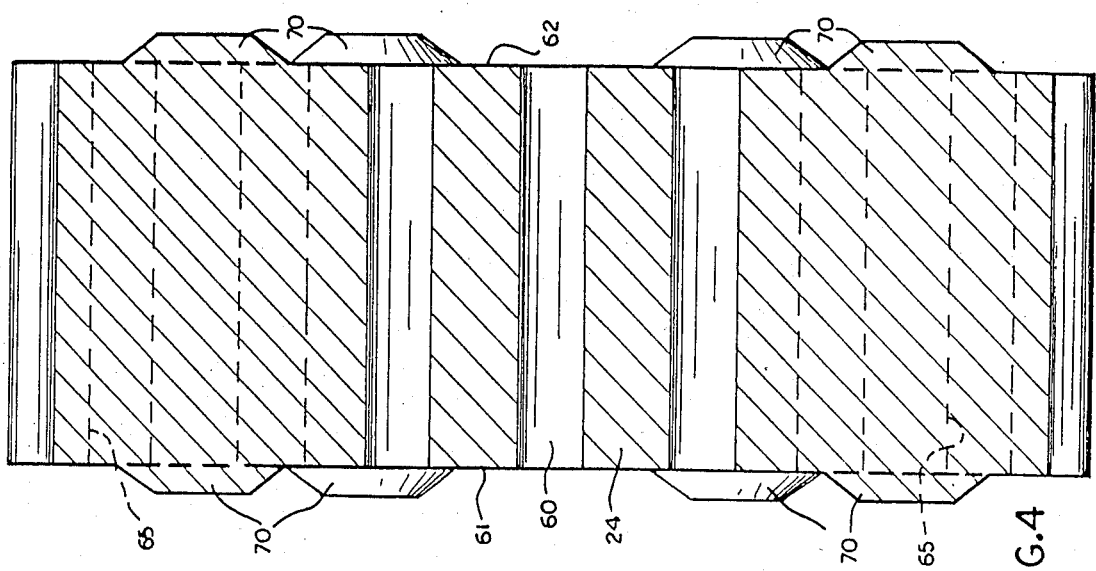
FIG. 4 is a cross sectional view of the grain of FIG. 3 taken approximately along the line 4—4 of FIG. 3.

Each of the grains 24 shown in FIGS. 3 and 4 has a relatively small cylindrical central passage 60 having an axis coincident with the central axis of the grain. The passage 60 extends between opposite axial end faces 61 and 62 of the grain 24. In addition, each grain 24 has a plurality of cylindrical passages 65 which extend axially through the grain 24 between the opposite end faces 61 and 62. The central axes of the passages 65 extend parallel to the central axis of the passage 60 and parallel to the central axis of the grain 24. The cross sections of the passages 60 and 65 are circular and identical in diameter and uniform throughout their extent.

The centers of the passages 65 are evenly spaced on concentric circles which have their centers on the central axis of the grain 24. There are eighteen passages 65 on the outer concentric circle, twelve passages 65 on the intermediate concentric circle and six passages 65 on the inner concentric circle. Thus, the total number of passages 65 extending between the opposite end faces of each grain 24 is thirty-seven, counting the one passage 60 at the center of the grain 24. The passages are located to promote uniform combustion of the grains 24 as described in detail in copending application Ser. No. 915,266.

The gas which is generated within the various passages of the grains 23, 24 must be able to get out of the passages and flow through the filter 31 and housing 36 into the airbag 10 to inflate the airbag 10. To provide for such flow, spaces are provided between axial end faces of adjacent grains 23, 24. The spaces at opposite axial ends of the grains extend radially outwardly from the central passages 50, 60 of the grains to the cylindrical outer side surfaces of the grains. The spaces are provided by axially projecting standoff pads or projections 70 formed on the axially opposite end faces of the grains. Each of the pads 70 has a circular configuration. The standoff pads 70 for one grain engage the standoff pads 70 on the next adjacent grain to provide spaces of equal width or axial extent between the grains.

The grains 23, 24 may be made of an alkali metal azide compound. Those compounds are represented by the formula $MN_3$ where M is an alkali metal, preferably sodium or potassium and most preferably sodium. Each grain is made of a material which includes 61 to 68% by weight of sodium azide, 0 to 5% by weight of sodium nitrate, 0 to 5% by weight of bentonite, 23 to 28% by weight of iron oxide, 2 to 6% by weight of graphite fibers and 1 to 2% of fumed silicon dioxide, alumina or titania. Preferably the composition of the grain is 63% by weight of sodium azide, 2.5% by weight of sodium nitrate, 2% by weight of bentonite, 26.5% by weight of iron oxide, 4% by weight of graphite fiber and 2% by weight of fumed silicon dioxide. The fumed silicon dioxide is sold under the trademark CAB-O-SIL by The Cabot Manufacturing Company with a product designation EH5. The graphite fibers are 3–15 microns in diameter and 40 to 125 thousandths of an inch in average length.

The material of which each grain is made is essentially known accept for the inclusion of the graphite fibers. The graphite fibers provide significant advantages. The graphite fibers cause the grain to burn at an increased rate and at decreased temperature. Specifically, the graphite fibers increase the burn rate of the grain by 40% as compared to grains without such fibers. The burn rate of the grain is increased because of the substantial thermal conductivity of the graphite fibers. The grain burns at a relatively low temperature in the neighborhood of 1800 degrees F. The combustion temperature of the grain is decreased because of the specific heat (thermal capacity) of the added graphite fibers. The combustion of the grain has no effect on the graphite fibers.

The graphite fibers also provide mechanical reinforcement to the grain. Specifically, the graphite fibers mimimize the possibility of the grain cracking prior to combustion. Cracks in a grain would produce unwanted additional grain surface area that would be available for combustion and would act to accelerate the grain burn rate in an unpredictable manner. The graphite fibers also mechanically reinforce the grain during and after combustion so that it more readily forms a strong structural sinter which is desirable. The sinter controls the combustion products of the grain and thus somewhat supplements and simplifies the filter construction.

While graphite fibers are preferred, it should be clear that any fiber material can be utilized which has high thermal conductivity above about 200 watts per meter per degree kelvin and a melting temperature above the combustion temperature of the grain, namely above about 2000 degrees F. For example, iron fibers and glass fibers could also be used.

The materials of which the grain is made are mixed together into a slurry with a suitable solvent such as water. The material is then formed into the cylindrical grains 20 in a suitable press. The grains are dried and coated with an ignition enhancer.

The method of applying the ignition enhancer coating is not critical. One preferred method of coating the grains involves first preparing a liquid coating mix. The various ingredients of the coating are mixed in an appropriate container with a suitable solvent such as acetone or methyl alcohol. The grains are then placed in a steel mesh basket. The grains and the basket are immersed in the coating liquid and then removed from the coating liquid. One specific apparatus which can be used to so coat the grains is a Model S-10 bulk coating system sold by the Spring Tools Company of Schoolcraft, Michigan.

The grain is weighed before and after coating to determine the grain weight gain due to the coating. To decrease the weight of the coating, more solvent can be added to the mix. Conversely, to increase the weight of the coating, some solvent may be permitted to evaporate from the mix. Generally, the coating should provide a weight gain of 1 to 4% of the total weight of the grain prior to being coated.

The coating includes 20 to 50% by weight of an alkali metal azide, preferably sodium azide, 25 to 35% by weight of an inorganic oxidizer, preferably sodium nitrate, 1 to 3% by weight of fumed silicon dioxide, 10 to 15% by weight of a fluoroelastomer such as Viton or Teflon (Du Pont Company), and 15 to 25% by weight of magnesium. Preferably the coating mix includes about 43% by weight of sodium azide, about 28% by weight of sodium nitrate, about 2% by weight of fumed silicon dioxide, about 10% by weight of a fluoroelastomer such as Teflon or Viton, and about 16% by weight of magnesium. Preferred fluoroelastomers are those comprising a major proportion of vinylidene fluoride and a minor proportion of hexafluoropropylene. Viton fluoroelastomers having a 60/40 weight percent ratio of vinylidene fluoride/hexafluoropropylene are most preferred. The acetone solvent dissolves the fluoroelastomer.

The fumed silicon dioxide is sold by the Cabot Manufacturing Company under the trademark CAB-O-SIL and has a product designation of EH5. The fumed silicon dioxide has a particle size of 0.01 microns. Fumed alumina or titania can be substituted for the fumed silicon dioxide. The magnesium preferably has a particle size of 45 microns, and the sodium azide and sodium nitrate preferably have a particle size of 4 microns.

The sodium azide in the coating functions to produce the gas (nitrogen) which is generated by burning the coating. The sodium nitrate functions as an oxidizer providing oxygen to support the burning. The fumed silicon dioxide functions in the coating mix as a suspension agent and specifically keeps the ingredients suspended in the mix so that a uniform coating is applied to the grain. The fluoroelastomer functions as a binder in the coating and provides somewhat of a moisture barrier. The magnesium functions to produce heat to initiate the burning. The particle size of the magnesium controls the ignition somewhat, i.e. the larger the particle size the slower the ignition.

In addition, 1 to 6% by weight of graphite may be added to the coating. The graphite functions in the coating as a roughening agent which makes the coating somewhat irregular and thus more readily ignitable.

When the squib 21 is actuated, all surfaces of the grains 23, 24 ignite nearly simultaneously. The ingredients of the coating insure a reliable ignition of the coating. The burning of the ingredients of the coating provide heat transfer to ignite the material of the grains. The coating controls the heat generation at the interface of the grains with the filter 31. This is important to prevent damage to the filter due to overheating of the filter. The coating does not burn so fast that pressure is built up in the passages in the grains which pressure could result in the grains breaking or cracking.

From the above description of a preferred embodiment of the invention, those skilled in the art will perceive improvements, changes and modifications. Such improvements, changes and modifications within the skill of the art are intended to be covered by the appended claims.

I claim:

1. A structure for generating gas, said structure comprising:
   a grain made of an azide based material which generates gas and forms a sinter upon combustion;
   said gas generating material including from about 2 to about 6% by weight of graphite fibers,
   said graphite fibers having a diameter of 3-15 microns and an average length of 40 to 125 thousandths of an inch to reinforce the sinter which remains after combustion of the gas generating material.

2. The structure defined in claim 1 wherein, said grain has opposite ends and passages which extend through the grain and intersect said opposite ends.

3. The structure defined in claim 1 wherein said material comprises:
   61-68% by weight of sodium azide,
   0-5% by weight of sodium nitrate,
   0-5% by weight of bentonite,
   23-28% by weight of iron oxide, and
   1-2% by weight of fumed silicon dioxide.

4. A structure for generating gas, said structure comprising:
   a grain which generates gas and forms a sinter upon combustion;
   said grain being made of an alkali metal azide based material and having 2-6% fibers therein which have a melting temperature above the combustion temperature of the grain and a thermal conductivity above about 200 watts per meter per degree kelvin.

5. A structure as defined in claim 4 wherein said fibers are graphite fibers having a diameter of 3-15 microns and an average length of 40 to 125 thousandths of an inch.

6. A structure as defined in claim 4 wherein said grain further has an ignition enhancing coating thereon.

7. A structure as defined in claim 5 wherein said material comprises:
   61-68% by weight of sodium azide,
   0-5% by weight of sodium nitrate,
   0-5% by weight of bentonite,
   23-28% by weight of iron oxide, and
   1-2% by weight of fumed silicon dioxide.

* * * * *